United States Patent [19]

Hooker et al.

[11] Patent Number: 4,696,776

[45] Date of Patent: Sep. 29, 1987

[54] METHOD OF PRODUCING POLYURETHANE FOAMS FOR LOW STRESS ENCAPSULATION

[75] Inventors: James R. Hooker; Robert M. Foss, both of Scottsdale, Ariz.

[73] Assignee: Motorola, Inc., Schaumburg, Ill.

[21] Appl. No.: 887,596

[22] Filed: Jul. 21, 1986

[51] Int. Cl.⁴ .............................................. B29C 67/00
[52] U.S. Cl. .................................. 264/46.4; 264/46.7; 264/50; 264/272.11; 264/272.13; 264/DIG. 5; 264/DIG. 7; 521/54; 521/137
[58] Field of Search ................. 521/54, 137; 264/46.4, 264/46.7, 50, 272.11, 272.13, DIG. 5, DIG. 7

[56] References Cited

U.S. PATENT DOCUMENTS

| | | | |
|---|---|---|---|
| 3,256,218 | 6/1966 | Knox | 521/54 |
| 3,300,421 | 1/1967 | Merriman et al. | 521/54 |
| 3,594,335 | 7/1971 | Schultz et al. | 521/54 |
| 3,772,219 | 11/1973 | Schwarz | 521/54 |
| 4,231,986 | 11/1980 | Brauer et al. | 264/272.11 |
| 4,355,130 | 10/1982 | Heinze | 264/272.11 |
| 4,533,598 | 8/1985 | Downey et al. | 264/272.13 |

FOREIGN PATENT DOCUMENTS 853941  11/1960  United Kingdom ........... 264/272.13

*Primary Examiner*—Morton Foelak
*Attorney, Agent, or Firm*—Harry A. Wolin; Eugene A. Parsons

[57] ABSTRACT

A method for encapsulating electronic components in high acceleration and high thermal cycling environments. A liquid uncured thermal setting polyurethane formulation is mixed with a finely ground particulate foam which serves as a nucleating agent. The mixture is in accordance with the polyurethane formulation. The resultant foam contains open air pockets which allow it to be compressed and then re-expand.

3 Claims, 1 Drawing Figure

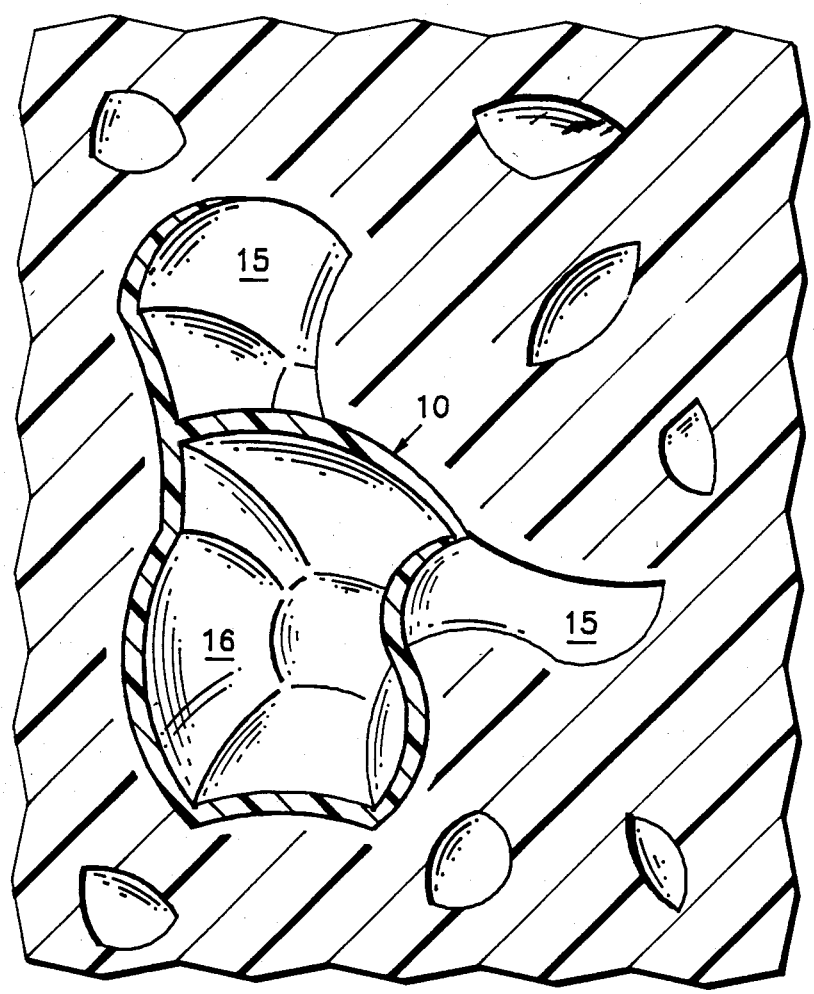

METHOD OF PRODUCING POLYURETHANE FOAMS FOR LOW STRESS ENCAPSULATION

BACKGROUND OF THE INVENTION

The present invention pertains to materials and a method of producing the materials for use in encapsulation of electronic components and the like which are to be utilized in high acceleration and high thermal cycling environments. Also, the materials may be used for other energy absorbtive means. In high acceleration and high thermal cycling environments, the thermal expansion coefficients of electronic components and encapsulating materials differ. Therefore, a foam is needed which will not apply thermal expansion stress to the electronic components which are encapsulated so that the electronic circuitry is not rendered ineffective.

Typically, foams used for encapsulation of electronic components in high acceleration and high thermal cycling environments are chemically blown or mechanically frothed possibly requiring toxic chemical blowing agents such as freon, self stabilizer chemicals or cabon dioxide ($CO_2$) reactions. In such environments, solid polyurethane formulations tend to cause stress damage. Also, solid polyurethane formulations do not sufficiently re-expand after they are compressed. In addition, chemically foaming polyurethane is an extremely difficult process to control.

Methods such as mixing air bubbles or hollow glass microspheres into an uncured, thermosetting resin are well known in the art. However, a material is needed which cures at a temperature and pressure so as not to damage the encapsulated electronic components, has better re-expansion properties and can be more flexible.

SUMMARY OF THE INVENTION

In the present invention, encapsulating material for electronic components and the like to be utilized in high acceleration and high thermal cyclying environments is prepared by mixing practically any uncured liquid thermosetting polyurethane formulation and a finely ground particulate foam. The foam is added by weight so as to control the density of the resulting material after the curing process. These foams can be from a wide range of elastomeric, rigid, or semi-rigid foams. These filler material foams act as a nucleating agent to generate expanded air pockets in the mixture as it is subjected to curing temperatures. In addition, a controlled amount of air cells or individual microspheres of a flexible material may be added to the mixture.

The mixture of the polyurethane formulation and the particulate foam is poured into a form, casting, or the like containing the electronic components to be encapsulated. Next, the mixture must be cured at a predetermined temperature for a predetermined period of time dependent upon the polyurethane formulation which is used. The time and temperature must be sufficient to cure the mixture but not to damage the encapsulated electronic components. Because the particulate foam is a non-chemical nucleating agent, noxious gases and the like do not result during the curing process. This type of nucleating agent causes an expansion of the air pockets during the curing process.

It is an object of the present invention to provide an encapsulating material for electronic components to be utilized in high acceleration and high thermal cycling environments which re-expands following compression.

It is a further object of the present invention to provide an encapsulating material for electronic components to be utilized in high acceleration and high thermal cycling environments which applies a very low thermal expansion stress to the encapsulated electronic components.

It is a further object of the present invention to provide an encapsulating material for electronic components to be utilized in high acceleration and high thermal cycling environments which does not result in excessive flashing.

It is a further object of the present invention to provide an encapsulating material for electronic components to be utilized in high acceleration and high thermal cycling environments which uses a non-chemical nucleating agent so as not to require chemical blowing agents, cell stabilizer chemicals or carbon dioxide reactions.

It is a further object of the present invention to provide an encapsulating material for electronic components to be utilized in high acceleration and high thermal cycling environments from formulations not originally designed to produce foams.

It is a further object of the present invention to decrease the cost of producing foams for electronic component encapsulation and other applications where foams are used.

These and other objects of this invention will become apparent to those skilled in the art upon consideration of the accompanying specification and claims.

BRIEF DESCRIPTION OF THE DRAWING

The FIGURE is a highly magnified cross-sectional view of open and closed air pockets contained in a foam particle embodying the present invention.

DESCRIPTION OF THE PREFERRED EMBODIMENT

In high acceleration and high thermal cycling environments, external forces cause the electronic components of a circuit to move relative to each other causing difficulties relating to the circuit's performance. Because of this problem, the electronic components must be immobilized. Traditionally, this is done by encapsulating them in a resin or foam. A problem arises however, when thermal cycling occurs. Because the resin or foam has a different thermal expansion coefficient than the electronic components which are encapsulated, the electronic circuits tend to be pulled apart. Therefore, the encapsulating foam or resin must be flexible enough to accommodate these expansion differentials. The present invention has been developed so that this flexibility is present and the proper functioning of electronic components in high acceleration and high thermal cycling environments occurs. In addition to stress free encapsulation of electronic devices, the present invention lowers the density and costs of standard polyurethane castings and energy absorbed components such as seats, mattresses, automotive interior parts and the like.

The first step for production of the material in the present invention is to select an uncured formulation of thermosetting polyurethane resin. This resin can be any of a wide range of polyurethane resins. The chosen formulation should have properties of curing temperature and time so as not to damage the electronic components which are to be encapsulated. Next, a finely ground flexible particulate foam is to be selected to be used as a nucleating agent in the polyurethane formulation. This non-chemical nucleating agent can be either elastomeric, rigid or semi-rigid. The particulate foam is added to the polyurethane formulation by weight so that the desired density of the final product is provided. The particulate foam and the polyurethane formulation should be mixed until a homogeneous mixture exists. This homogeneous mixture must be flowable between and around the various electronic components which are to be encapsulated. In addition, air bubbles or microspheres of a flexible material may be added to further enhance the flexibility of the product foam.

The flowable, homogeneous mixture of particulate foam and polyurethane formulation must be poured into a form, casting or the like containing the electronic components which are to be encapsulated. The mixture must be uniformly dispersed about the electronic components. Next, the curing process must take place. Again, the curing process is for a predetermined period of time at a predetermined temperature in accordance with the particular polyurethane formulation which was used and also so not to damage the electronic components to be encapsulated. During the curing process, the air pockets formed by the nucleating agent expand throughout the mixture. Referring specifically to the FIGURE a highly magnified cross-sectional view of a foam particle embodying the present invention is shown. The foam particle designated 10 is shown to have pockets 15. As the curing process proceeds, air pocket 15 expands throughout. Air trapped in pockets 15 is similar to an open air bubble which is easily compressible and re-expandable throughout the resultant foam. In addition, foam particles may or may not include one or more closed air cells such as designated 16 in the FIGURE. The resultant foam is flexible, porous, and of uniform cell size. However, the present invention may also be used to produce rigid foams.

EXAMPLE

Initially, polymer cast V356 HEF80, a two-part polyurethane resin manufactured by U.S. Polymeric Company was used as the thermosetting polyurethane resin. 30.0 grams of part A and 31.5 grams of part B were weighed out and mixed. Both of these resin components are liquids. To this uncured thermosetting polyurethane resin formulation, 6.8 grams of a finely ground particulate foam nucleating agent was added. This particulate foam is a discardable product from a grinding and sanding operation. The foam used was Poron which is manufactured by the Rogers Corporation. The ground Poron foam and the V356 resin formulation were thoroughly mixed into a homogeneous mixture by hand. This mixture was poured into an open sheet mold. The material was cured 20 minutes at a temperature of 180° F. This procedure resulted in a foam which is flexible, porous, and of uniform cell size.

Additional work was done with the V356-Poron particulate foam mix. Samples of 5% by weight, 10% by weight, and 20% by weight of the Poron particulate foam were used. Each of these samples resulted in a useful foam. The 5% by weight Poron loading resulted in a foam with a density of 27.5 lbs/ft$^3$. The 10% by weight Poron loading resulted in a foam with a density of 26.2 lbs/ft$^3$. The 20% by weight Poron loading resulted in a foam with a density of 23.2 lbs/ft$^3$.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A method of encapsulating electronic components and the like comprising the steps of:
   selecting an uncured liquid thermosetting polyurethane formulation;
   selecting one or more of the group consisting of elastomeric, rigid and semi-rigid finely ground particulate foams to act as a nucleating agent;
   adding said particulate foam by weight to said liquid polyurethane formulation;
   mixing said particulate foam and said liquid polyurethane formulation into a substantially homogeneous mixture;
   applying said homogeneous mixture of said particulate foam and said liquid polyurethane formulation to one of a form, casting, and the like containing electronic components to be encapsulated; and
   curing said homogeneous mixture encapsulating electronic components for a pre-determined period of time at a predetermined temperature relative to the polyurethane formulation used.

2. The method of claim 1 wherein the finely ground particulate foam contains at least one of closed air cells and reticulated foam structure which carries associated air bubbles.

3. The method of claim 1 wherein a controlled amount of at least one of air cells, air bubbles and individual microspheres of flexible material may be added to the homogeneous mixture.

* * * * *